United States Patent [19]

Phan et al.

[11] Patent Number: 5,039,339

[45] Date of Patent: Aug. 13, 1991

[54] INK COMPOSITION CONTAINING A BLEND OF A POLYESTER AND AN ACRYLIC POLYMER

[75] Inventors: Hieu D. Phan, Kingsport; Gary W. Carrier, Bristol; Rebecca R. Stockl; Frank J. Tortorici, both of Kingsport; R. Gary Wulf, Kingsport, all of Tenn.

[73] Assignee: Eastman Kodak Company, Rochester, N.Y.

[21] Appl. No.: 578,380

[22] Filed: Sep. 7, 1990

Related U.S. Application Data

[62] Division of Ser. No. 225,520, Jul. 28, 1988, Pat. No. 4,996,252.

[51] Int. Cl.⁵ .................. B32B 27/36; B32B 27/06; C09D 11/02; C08L 67/02
[52] U.S. Cl. .................. 428/481; 106/20; 428/458; 428/537.5; 428/430; 428/412; 428/480; 525/167; 525/174; 524/513; 524/514; 524/88
[58] Field of Search .............. 106/20; 428/458, 537.5, 428/430, 412, 481, 480; 525/167, 174; 524/513, 514, 88

[56] References Cited

U.S. PATENT DOCUMENTS

| | | | |
|---|---|---|---|
| 3,734,874 | 5/1973 | Kibler et al. | 524/603 |
| 3,779,993 | 12/1973 | Kibler et al. | 524/603 |
| 4,073,777 | 2/1978 | O'Neill et al. | 428/480 |
| 4,145,469 | 3/1979 | Newkirk et al. | 428/245 |
| 4,148,779 | 4/1979 | Blackwell et al. | 524/321 |
| 4,233,196 | 11/1980 | Sublett | 524/602 |
| 4,304,900 | 12/1981 | O'Neill et al. | 524/603 |
| 4,304,901 | 12/1981 | O'Neill et al. | 524/602 |
| 4,335,220 | 6/1982 | Coney | 523/414 |
| 4,704,309 | 11/1987 | Coney et al. | 427/258 |
| 4,880,700 | 11/1989 | Charmot et al. | 428/337 |

FOREIGN PATENT DOCUMENTS

| | | |
|---|---|---|
| 157476 | 12/1981 | Japan . |
| 124651 | 7/1983 | Japan . |
| 147354 | 9/1983 | Japan . |
| 63162 | 4/1985 | Japan . |
| 190389 | 9/1985 | Japan . |

OTHER PUBLICATIONS

Soviet Inventions Illustrated, 3-4-81, Section P, Derwent Publications, (London, GB), Class G, Ab. No. 05128 D/04, SU734239 (Kiev. Printing Polyg) 3-18-80.
Patent Abstracts of Japan, vol. 12, No. 28 (C-471) (2875), 1-27-88 (JP.A, 62177074, Mitsubishi Rayon Co., Aug. 3, 1987).

*Primary Examiner*—Mark L. Bell
*Assistant Examiner*—Helene Klemanski
*Attorney, Agent, or Firm*—Thomas R. Savitsky; William P. Heath, Jr.

[57] ABSTRACT

Disclosed is a novel blend of a water-dissipatable polyester material and an acrylic polymer. The acrylic polymer must be compatible with the polyester and can be optionally styrenated. The polyester is exemplified in having an acid component of from about 75 to about 84 mole % isophthalic acid and conversely from about 25 to about 16 mole % 5-soldiosulfoisophthalic acid, and having a glycol component of from about 45 to about 60 mole % diethylene glycol and conversely from about 55 to about 44 mole % 1,4-cyclohexanedimethanol or ethylene glycol or mixtures thereof.

The polymer blends are useful for preparing ink compositions having improved block resistance and water resistance.

17 Claims, No Drawings

INK COMPOSITION CONTAINING A BLEND OF A POLYESTER AND AN ACRYLIC POLYMER

This is a divisional of copending application Ser. No. 07/225,520 filed on July 28, 1988, now U.S. Pat. No. 4,996,252.

FIELD OF INVENTION

The present invention relates to a novel polymer blend useful in printing inks which contains a linear, water-dissipatable polyester or polyesteramide material in combination with an acrylic polymer.

BACKGROUND OF THE INVENTION

Inks containing a water-dissipatable polyester or polyesteramide are well known in the art (see, for example, U.S. Pat. Nos. 4,704,309 and 4,738,785). Inks containing such a polymeric material have many desirable properties such as good adhesion to a variety of substrates and a wide viscosity range. However, despite the advantages obtained using such a polymeric material in aqueous inks, it is known that aqueous inks with such a polymer by itself have serious problems for many applications, namely poor water resistance and poor block resistance (e.g., see Japanese Kokai 57-10663). It would be highly desirable to have a material that imparts good water resistance and block resistance while maintaining the other advantages associated with the use of the water-dissipatable polyester or polyesteramide.

SUMMARY OF THE INVENTION

It has now been discovered that the water-dissipatable polyester material as described herein, when mixed with an acrylic polymer, will provide to ink compositions good water resistance and good block resistance without concomitant substantial sacrifice of the advantages obtained by use of the water-dissipatable polyester material alone. This polymer blend can be used to prepare water-based inks, ink overprints and ink primers, which shall be referred to herein collectively as "ink compositions." More specifically, the present invention is directed to a polymer blend comprising:

(A) One or more water-dissipatable or dispersible polymers having carbonyloxy linking groups (i.e., ester groups of the formula

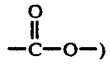

in the linear molecular structure wherein up to 80% of the linking groups are carbonylamido linking groups, (i.e., amide groups of the formula

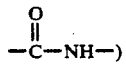

the polymer having an inherent viscosity of from about 0.1 to about 1.0 measured in a 60/40 parts by weight solution of phenol/tetrachloroethane at 25° C. and at a concentration of 0.25 gram of polymer in 100 mL of the solvent, the polymer containing substantially equimolar proportions of acid equivalents (100 mole %) to hydroxy and amino equivalents (100 mole %), the polymer comprising the reaction products of reactants selected from (a), (b), (c), (d), and (e), or the ester forming or esteramide forming derivatives thereof, as follows wherein all stated mole percentages are based on the total of all acid, hydroxyl and amino equivalents being equal to 200 mole %:

(a) at least one difunctional dicarboxylic acid;

(b) from about 4 to about 25 mole % of at least one difunctional sulfomonomer containing at least one metallic sulfonate group or nitrogen-containing non-metallic sulfonate group attached to an aromatic or cycloaliphatic nucleus wherein the functional groups are hydroxy, carboxyl or amino;

(c) at least one difunctional reactant selected from a glycol or a mixture of a glycol and diamine having two —NRH groups, the glycol containing two —CH$_2$—OH groups of which (1) at least 15 mole % is a poly(ethylene glycol) having the structural formula

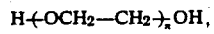

n being an integer of from 2 to about 20, or (2) of which from about 0.1 to less than about 15 mole % is a poly(ethylene glycol) having the structural formula

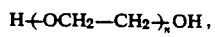

n being an integer of between 2 and about 500, and with the proviso that the mole % of said poly(ethylene glycol) within said range is inversely proportional to the quantity of n within said range; and (d) from none to about 40 mole % of difunctional reactant selected from hydroxycarboxylic acids having one —C(R)$_2$—OH group, aminocarboxylic acids having one —NRH group, amino—alcohols having one —C(R)$_2$—OH group and one —NRH group, or mixtures of said difunctional reactants;

wherein each R in the (c) and (d) reactants is a hydrogen atom or an alkyl group of 1 to 4 carbons, and (B) an acrylic polymer in an amount of about 10 to 55 percent, based on the total weight of Components (A) and (B), said acrylic polymer being compatible with the water-dissipatable polyester at a maximum acrylic polymer concentration of about 60/40 weight percent of the total acrylic/polyester polymer solids.

The present invention is also directed to an ink composition made from the polymer blend of this invention comprising:

(I) about 5 to 40 weight percent of the polymer blend, (II) about 0 to 45 weight percent of at least one colorant, and (III) about 35 to 95 weight percent of water.

DETAILED DESCRIPTION OF THE INVENTION

As used herein, the term "water-dissipatable polyester", "water-dissipatable polyester material", "polyester material", or "polyester" refers to Component (A) described hereinabove and "acrylic polymer" refers to Component (B) described hereinabove, and "polymer blend" refers to a blend of Component (A) and Component (B).

Whenever the term "water-dissipatable" or "water-dispersible" is used in this description, it will be understood to refer to the activity of a water or aqueous solution on the polymer. The term is specifically intended to cover those situations wherein the solution dissolves and/or disperses the polyester material therein and/or therethrough.

By the phrase "an amount effective to increase the block resistance or water resistance properties of . . ." is meant that amount of acrylic polymer that, when added to the water-dissipatable polyester, will increase the block resistance and/or water resistance of an ink composition as compared to a comparable ink composition without said acrylic polymer. It is preferred that the water resistance of ink compositions made from the polymer blend of the present invention is at least good; more preferred is excellent. It is also preferred, concerning block resistance, that the ink compositions made from the polymer blend of the present invention do not block above about 100° F. (37.78° C.); more preferably do not block above about 120° to 220° F. (48.89° to 104.44° C.), for 5 seconds on a Sentinel Heat Sealer at 40 psi (275.79 kilopascal). Water resistance can be determined by the procedure described in Example 5. Block resistance can be determined by the procedure described in Example 7.

By the term "compatible" is meant that a 60/40 weight blend of acrylic/polyester polymer (or a blend with less acrylic polymer) will not gel or have a significant increase in viscosity after being held at 120° F. (48.89° C.) for 24 hours or at room temperature for 14 days. By the term "gel" or "gelling" is meant that the blend is not pourable at room temperature. A significant viscosty increase after 24 hours at 120° F. (48.89° C.) is typically at least two or three times the viscosity at zero time. The acrylic polymers which are compatible at the higher acrylic concentrations of the acrylic/polyester blends are preferred. For example, acrylic polymers that are compatible in acrylic concentrations up to a 60/40 weight blend of acrylic/polyester are preferred over acrylic polymers that are compatible only up to a 50/50 weight blend of acrylic/polyester. Preferred acrylic polymers are compatible at acrylic concentrations of at least 30/70 (weight blend of acrylic/polyester) (i.e., at least 30 weight percent acrylic polymer) and more preferred acrylic polymers are compatible at acrylic concentrations of at least 40/60 (i.e., at least 40 weight percent acrylic polymer).

In the polymer blend of the present invention it is preferred that Component (B) is present in an amount effective to increase the block resistance or water resistance properties of Component (A) when formulated into an ink composition; Also preferably Component (B) is present in an amount of about 30 percent to 45 percent; and Component (A) is present in an amount of about 45 percent to 90 percent, more preferably 55 percent to 70 percent; these percentages being based on the total weight of Components (A) and (B).

In the ink compositions of the present invention it is preferred that Component (I) is present in an amount of about 5 to 40 weight percent, that Component (II) is present in an amount of about 0 to 35 weight percent, and that Component III is present in an amount of about 35 to 95 weight percent. If the ink composition is a finished ink, it is preferred that at least about 0.5 weight percent of colorant is present. More typically, in inks, at least about 5 weight percent of colorant is present. If the ink composition contains an organic pigment, typically such an organic pigment is present in an amount of about 17.5 weight percent or less of the total composition. If the ink composition contains an inorganic pigment, typically such inorganic pigment is present in an amount of about 30 weight percent or less of the total composition.

The ink compositions can optionally contain up to about 10 weight percent, preferably up to about 3 weight percent of one or more additives. Such additives include waxes such as Jonwax 26, Jonwax 120 (available from S. C. Johnson and Sons, Inc., Racine, Wis. 43403; U.S.A.), or Vanwax 35 (available from Vantage, Garfield, N.J. 07026); surfactants such as Surfynol 104 and Surfonyl 440 (available from Air Products and Chemicals, Allentown, Pa. 18105); modifiers (for example, defoamers) such as WBT-409, Resolv (available from Vantage), Carbowet 990 (available from Vantage), OT-70 aerosol (available from McIntyre, Chicago, Ill. 60632), Foamaster 111 (available from Henkel Corporation, Morristown, N.J. 07960); alcohols such as n-propyl alcohol, isopropyl alcohol, propylene glycol, ethylene glycol monobutyl ether, or ethylene glycol; biocides; pH stabilizers; dispersants; thickeners such as Acrysol RM-825 (available from Rohm & Haas, Philadelphia, Pa. 19105); and the like.

Typically, it is desirable to add a small amount of one or more pH stabilizers to the ink compositions to keep the pH within a desired range. For example, it is common to add about 0.1 weight percent sodium acetate to an ink or aqueous solution/dispersion of polymer blend.

Preferred amounts of certain additives in ink compositions of the present invention are set forth in the following table.

| Component | Weight Percent |
|---|---|
| Wax[a] | 0.0–3.0 |
| Surfactant[b] | 0.0–3.0 |
| Modifier[c] | 0.0–2.0 |
| Alcohol[d] | 0.0–8.0 |

[a] e.g., Jonwax 26,120, Vanwax 35
[b] e.g., Surfynol 104,440
[c] e.g., WBT 409, Resolv, Carbowet 990, Aerosol OT-70 Foamaster 111
[d] e.g., n-Propyl Alcohol or Isopropyl Alcohol; Propylene Glycol, Ethylene Glycol Monobutyl Ether In the water-dissipatable polymer useful in the present invention, the metallic portion of the metallic sulfonate group is preferably a monovalent metal such as $Na^+$, $K^+$, or $Li^+$. The nonmetallic portion of the nonmetallic sulfonate group is a nitrogen-based cation derived from nitrogen-containing bases which may be aliphatic, cycloaliphatic or aromatic basic compounds that have ionization constants in water at 25° C. of $10^{-3}$ to $10^{-10}$, preferably $10^{-5}$ to $10^{-8}$. Especially preferred nitrogen containing bases are ammonia, dimethylethanolamine, diethanolamine, triethanolamine, pyridine, morpholine, and piperidine. Such nitrogen-containing bases and cations derived therefrom are described in U.S. Pat. No. 4,304,901, incorporated herein by reference.

In the water-dissipatable polymer it is preferred that very minor, e.g., less than about 10 mol percent based on all reactants, of reactant (d) is employed, that at least about 70 mol percent of reactant (c) is glycol, and that at least about 70 mol percent of all the hydroxy equivalents is present in the glycol. It is also preferred that a substantial portion of reactant (c) is a cycloaliphatic-dimethanol, e.g., up to 50 mole percent of a cycloaliphaticdimethanol such as 1,4-cyclohexanedimethanol.

In preferred other embodiments of the invention:
the water-dissipatable polymeric material comprises an acid component (moiety) of from about 75 to about 84 mole percent isophthalic acid and conversely from about 25 to 16 mole percent 5-sodiosulfoisophthalic acid, and a glycol component (moiety) of from about 45 to about 60 mole % diethylene glycol and conversely from about 55 to 40 mole percent 1,4-cyclohexanedimethanol or ethylene glycol (the term "moiety" as used herein designates the residual portion of the reactant acid or glycol which actually enters into or onto the polymer chain during the condensation or polycondensation reaction);

the inherent viscosity of the water-dissipatable polymeric material is from about 0.28 to about 0.35, said acid component (moiety) comprises from about 80 to about 83 mole percent isophthalic acid and conversely from about 20 to about 17 mole percent 5-sodiosulfoisophthalic acid, and the glycol component (moiety) comprises from about 52 to about 56 mole percent diethylene glycol and conversely from about 48 to about 44 mole percent 1,4-cyclohexanedimethanol;

the ink composition is printed onto a substrate selected from metal foil, newsprint, bleached and unbleached Kraft paper, clay coated paper, glass, calendered paper, stainless paper, paper board, and films or othe substrates of polyester, polycarbonate, cellulose ester, regenerated cellulose, poly(vinylidene chloride), polyamide polypropylene, polyethylene or polystyrene; and after the ink composition is printed, a substantial portion of the initial metal cations of the water solubilizing sulfonate groups of the water-dissipatable polymeric material has been replaced with an insolubilizing polyvalent metal cation, such as $Al^{+3}$, $Ca^{++}$, or the like as disclosed and in the manner described in U.S. Pat. Nos. 4,145,469, and 4,704,309, the disclosures of which are incorporated herein by reference in their entirety. As stated therein, generally, based on the weight of the polymeric material, 0.05 percent to about 2.0 percent by weight solids of the polyvalent metal cation are required for effective insolubilization.

The inherent viscosities (I.V.) of the particular water-dissipatable polymeric materials useful herein range from about 0.1 to about 1.0 determined according to ASTM D2857-70 procedure, in a Wagner Viscometer of Lab Glass, Inc., of Vineland, New Jersey, having a ½ mL capillary bulb, using a polymer concentration about 0.25% by weight in 60/40 by weight of phenol/tetrachloroethane. The procedure is carried out by heating the polymer/solvent system at 120° C. for 15 minutes, cooling the solution to 25° C. and measuring the time of flow at 25° C. The I.V. is calculated from the equation $$(n) \frac{25° C.}{0.50\%} = \frac{\ln \frac{t_s}{t_o}}{C}$$

where:
(n) = inherent viscosity at 25° C. at a polymer concentration of 0.25 g/10 mL of solvent;
ln = natural logarithm;
$t_2$ = sample flow time;
$t_o$ = solvent-blank flow time; and
C = concentration of polymer in grams per 100 mL of solvent = 0.25.

The units of the inherent viscosity throughout this application are in deciliters/gram. It is noted that higher concentrations of polymer, e.g., 0.50 g of polymer/100 mL solvent may be employed for more precise I.V. determinations.

As appreciated in the art, the exact components and properties of components desired for any given ink application can vary, and, therefore, routine experimentation may be required to determine the optional components and proportions of components for a given application and desired properties.

The acrylic polymers useful in the present invention are commercially available and/or can be made using conventional techniques known in the art. The molecular weight of the acrylic polymer is at least about 10,000 and preferred is at least about 200,000.

It is preferred that the acrylic polymer useful in the present invention has an acid number of about 200 or less; more preferred is less than about 55 and most preferred is less than about 50. It is also preferred that the glass transition temperature (Tg) of the acrylic polymer is greater than about 0.

The acrylic polymer of the present invention preferably comprises repeating units of the formula:

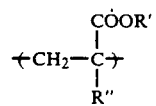

wherein R' is H, a straight, branched, or cyclic alkyl group of 1 to 20 carbon, preferably 1 to 10 carbon atoms, optionally substituted with up to 2 substituents such as $C_1$-$C_6$ alkoxy or halogen such as chloro- or bromo; and R" is H or methyl. More preferably R' is H, methyl, ethyl, propyl, isopropyl, n-butyl, sec-butyl, isobutyl, tert-butyl, hexyl, heptyl, 2-ethylhexyl, 2-ethylbutyl, dodecyl, hexadecyl, 2-ethoxyethyl, or cyclohexyl.

The acrylic polymer can optionally be styrenated and therefore further comprise repeating units of the formula:

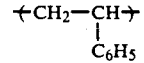

The acrylic polymer can also be a copolymer containing repeating units derived from an acrylonitule monomer.

The acrylic polymer can be blended with the polyester material in pure form or either or both polymers can be in a mixture with water or an aqueous solution. The mixture of the acrylic polymer and water or aqueous solution can be in the form of a water-borne alkali soluble resin, a colloidal dispersion, or emulsion. Preferred for use is an emulsion or dispersion of an acrylic polymer having a pH of about 7.5-9.0 and a Brookfield viscosity of about 200-1,000 centipoise (cp) at 25° C. Also preferred is an emulsion containing about 25-55 weight percent of acrylic polymer (more preferred about 45-50 weight percent) with the remainder of the emulsion being water or aqueous solution. If an aqueous solution is used to make the aqueous emulsion or dispersion of acrylic polymer, such solution will contain one or more additives typically used in the art in amounts of to about 5 weight percent of the emulsion, preferably about 1 to about 3 weight percent. Such additives can be emulsion stabilizers, surfactants, dispersants, antimicrobials or biocides, pH stabilizers, and the like. The additives described herein as suitable for use in the ink compositions are also suitable for use with the mixture of acrylic polymer and aqueous solution. The following Table 1 lists certain acrylic polymer emulsions (except for Joncryl 67 which is a solid or flake) commercially available and certain properties thereof. The acrylics having the tradename "Joncryl" are available from S. C. Johnson and Sons, Inc., Racine, Wis. 43403, U.S.A. and the acrylics having the tradename Vancryl are available from Vantage.

TABLE 1

| Type | Commercial Name | % Polymer of Nonvolatile | Molecular Weight of Polymer | Acid No. of Polymer | Glass Trans. Temp. of Polymer | Min. Filming Temp. | pH of Emulsion | Viscosity of Emulsion 25° C., CPS |
|---|---|---|---|---|---|---|---|---|
| Acrylic Emulsion | Joncryl 77 | 46 | >200,000 | 55 | 21 | 20 | 8.3 | 500 |
| Styrenated Acrylic Emulsion | Joncryl 87 | 48.5 | >200,000 | 40 | 100 | >80 | 8.3 | 500 |
| Styrenated Acrylic Emulsion | Joncryl 134 | 44.0 | >200,000 | 35 | 95 | 780 | 8.3 | 200 |
| Styrenated Acrylic Emulsion | Joncryl 1535 | 37.0 | >200,000 | 30 | 20 | 15 | 7.5 | 200 |
| Styrenated Acrylic Emulsion | Joncryl 619 | 49.0 | >200,000 | 36 | 97 | 35 | 8.2 | 950 |
| Styrenated Acrylic Emulsion | Vancryl 930 | 46.0 | — | — | — | — | 8.7 | 200 |
| Acrylic Emulsion | Joncryl 74 | 48.5 | >200,000 | 50 | −16 | <5 | 8.3 | 500 |
| Solid | Joncryl 67 | 98 | 10,000 | 190 | 70 | — | — | — |

Of course, it is contemplated that two or more polyester materials and/or two or more acrylic polymers can be used in the present invention. The water-dissipatable polymer can be made by known techniques, for example, by those disclosed in U.S. Pat. Nos. 3,734,874; 3,779,993; and 4,233,196; the disclosures of which are incorporated herein by reference in their entirety.

The aqueous solution or dispersion of water-dissipatable polyester to be blended with the acrylic polymer dispersion preferably comprises about 26 to 38 weight percent of polyester material with the remainder being water or an aqueous solution. The aqueous solution can be the same or be similar to the aqueous solution used to make the aqueous dispersion an emulsion of acrylic polymer, with the amount of additives being present in an amount of up to about 5 weight percent, preferably about 1 to about 3 weight percent.

The ink compositions of this invention can be for any of the typical ink applications such as flexographic, gravure, letterpress, ink-jet, or screen-process printing applications. The ink compositions of the present invention have excellent adhesion to a wide variety of substrates including plastic films such as polyester, polyethylene or polypropylene; aluminum foil; glass; and paper.

The ink compositions of the present invention should have a pH of about 8.2 or lower; preferred is a pH of about 7 to 8. If the pH is higher than about 8.2, there is a danger of the polymer(s) hydrolyzing which results in gelling of the system.

The polyester material can be dispersed in water or aqueous solution using the techniques described herein or known in the art and then blended with an aqueous dispersion or emulsion of acrylic polymer prepared by similar techniques, or blended with an aqueous emulsion or dispersion of acrylic polymer in a form commercially available. The following procedure can be used for dispersing the polyester in water: The water should be preheated to about 180° F. (82.22° C.) to about 200° F. (93.33° C.) and the polyester in pellet form is added rapidly to the vortex under high shear stirring. A Cowless Dissolver, Waring Blender, or similar equipment may be used. Once the water is heated to the desired temperature, additional heat input is not required. Depending upon the volume prepared, dispersion of the pellets should be complete within 15 to 30 minutes stirring. Continued agitation with cooling may be desirable to prevent thickening at the surface due to water evaporation. Viscosities of the dispersions remain low up to polyester levels of 25 percent to 30 percent and viscosities increase sharply above these levels. Viscosities of the dispersions will be influenced by the degree of polymer dispersion obtained which is affected by the dispersing temperature, shear, and time. The polyester blend content typically may range from about 15 percent to about 50 percent by weight of the aqueous dispersion with the preferred for most applications being from about 26 percent to about 38 percent.

The inks, overprints, and primers of this invention can be prepared, for example, as disclosed in U.S. Pat. No. 4,148,779, which is incorporated herein by reference in its entirety. For example, the printing ink, overprint, or primer may be prepared as follows: The colorant is added to the polymer blend dispersion and, at a properly adjusted viscosity, dispersed thereinto with ball mill, sand mill, high-shear fluid flow mill, Cowles Dissolver, Katy Mill or the like. The colorants also may be dispersed directly in the polymer by milling on a heated two-roll mill at about 220° to 360° F. (104.44° to 182.22° C.) and using processing aids as desired, such as solvents or plasticizers. The viscosity and printing characeristics of the ink composition may be modified further by addition of water, solvents, plasticizers, sequestered wax, surfactants and the like to suit the particular printing needs. The amounts and nature of these optional additives have been previously described herein.

The present invention is not limited to any type of dye, pigment, filler, or the like, all of which are hereinafter included in the term "colorant," and can accommodate any colorant which can be dispersed, milled, mixed, blended or dissolved in any manner in either the polymer blend, water or aqueous polymer system.

Exemplary useful C. I. pigments for use in the present invention are given in the following table:

| Generic Name | Pigments C.A. Index/Chemical Name |
|---|---|
| C.I. Pigment Yellow 17 | Butanamide, 2,2'-[(3,3'-dichloro[1,1'-bipehnyl] 4,4'-diyl)bis(azo)bis [N-(2-methoxypehnyl)-3-oxo- |
| C.I. Pigment Blue 27 | Ferrate (4-1), hexakis (cyano-C)-ammonium iron (3+)(1:1:1) |
| C.I. Pigment Red 49:2 | 1-Naphthalenesulfonic acid, 2-[(2-hydroxy-1-naphthalenyl)azo]-, calcium salt (2:1) |
| C.I. Pigment Red 81:1 | Benzoic acid, 2,-[6-ethyl-amino)-3-(ethylimino)-2,7-dimethyl-3H-xanthen-9-yl]-, ethyl ester, w/molybdenum tungsten hydroxide oxide phosphate |
| C.I. Pigment Red 81:3 | Benzoic acid, 2-[6-ethyl-amino)-3-ethylimino)-2,7-dimethyl-3H-xanthen-9-yl]-, ethyl ester, molybdatesilicate |
| C.I. Pigment Red 81:x | Benzoic acid, 2-[6-(ethyl-amino)-3-(ethylimino)-2,7-dimethyl-3H-xanthen-9-yl]-, ethyl ester, molybdatephosphate |
| C.I. Pigment Yellow 83 | Butanamide, 2,2'-[(3,3'-dichloro[1,1'-biphenyl]-4,4'-diyl)bis(azo)bis[N-(4-chloro-2,5-dimethoxy-phenyl)-3-oxo- |
| C.I. Pigment Red 57:1 | 2-Naphthalenecarboxylic acid, 3-hydroxy-4-[(4-methyl-2-sulfophenyl)azo]-, calcium salt (1:1) |
| C.I. Pigment Red 49:1 | 1-Naphthalenesulfonic acid, 2-[(2-hydroxy-1-naphthalenyl)azo]-, barium salt (2:1) |
| C.I. Pigment Violet 23 | Diindolo[3,3',2'm] triphenodioxazine, 8,18-dichloro-5,15-diethyl-5,15-dihydro- |
| C.I. Pigment Green 7 | C.I. Pigment Green 7 |
| C.I. Pigment Blue 61 | Benzenesulfonic acid, [[4-[[4-phenylamino)-phenyl]-[4-(phenylimino)-2,5-cyclohexadien-1-ylidene]methyl]-phenyl] amino]- |
| C.I. Pigment Red 48:1 | 2-Naphthalenecarboxylic acid, 4-[(5-chloro-4-methyl-2-sulfophenyl)azo]-3-hydroxy-, barium salt (1:1) |
| C.I. Pigment Red 52:1 | 2-Naphthalenecarboxylic acid, 4-[(4-chloro-5-methyl-2-sulfophenyl)azo]-3-hydroxy-, calcium salt (1:1) |
| C.I. Pigment Violet 1 | Ethanaminium, N-[9-(2-carboxyphenyl)-6-(diethyl-amino)-3H-xanthen-3-ylidene]-N-ethyl-, molyb-datetungstatephosphate |
| C.I. Pigment White 6 | Titanium oxide (TiO$_2$) |
| C.I. Pigment Blue 15 | Copper, [29H, 31H-phthalocyaninato (2-)-N$^{29}$, N$^{30}$, N$^{31}$, N$^{32}$[-, (Sp-4-1)- |
| C.I. Pigent Yellow 12 | Butanamide, 2,2'-[(3,3'-dichloro[1,1'-biphenyl]-4,4'-diyl)bis(azo)]bis[3-oxo-N-phenyl- |
| C.I. Pigment Blue 56 | Benzenesulfonic acid, 2-methyl-4-[[4-[[4-[(3-methylphenyl)amino] phenyl]-[4-[(3-methyl-phenyl)-imino]-2-5-cyclohexadien-1-ylidene]methyl]-phenyl] amino]- |
| C.I. Pigment Orange 5 | 2-Naphthalenol, 1-[(2,4-dinitrophenyl)azo]- |
| C.I. Pigment Black 7 | Carbon black |
| C.I. Pigment Yellow 14 | Butanamide, 2,2'-[(3,3'-dichloro[1,1'-biphenyl]-4,4'-diyl)bis(azo)]bis-[N-(2-methylpheny10-3-oxo- |
| C.I. Pigment Red 48:2 | 2-Naphthalenecarboxylic acid, 4-[(5-chloro-4-methyl-2-sulfophenyl)-azo]-3-hydroxy-, calcium salt (1:1) |
| C.I. Pigment Blue 15:3 | Copper, [29H, 31H-phthalocyaninato (2-)-N$^{29}$, N$^{30}$, N$^{31}$, N$^{32}$]-, (SP-4-1)- |
| C.I. Pigment Yellow 1 | Butanamide, 2-[(4-methyl-2-nitrophenyl)azo]-3-oxo-N-phenyl- |
| C.I. Pigment Yellow 3 | Butanamide, 2-[(4-chloro-2-nitrophenyl) azo]-N-(2-chlorophenyl)-3-oxo- |
| C.I. Pigment Yellow 13 | Butanamide, 2,2'-(3,3'-dichloro[1,1'-biphenyl]-4,4'-diyl)bis(azo)]bis [N-(2,4-dimethylphenyl)-B-oxo- |
| C.I. Pigment Orange 16 | Butanamide, 2,2'-[(3,3'-dimethoxy[1,1'-biphenyl]-4,4'-diyl)bis(azo)]bis [3-oxo-N-phenyl- |
| C.I. Pigment Yellow 55 | Butanamide, 2,2'-[(3,3'-dichloro[1,1'-biphenyl]-4,4'-diyl)bis(azo)]bis [N-(4-methylphenyl)-3-oxo- |
| C.I. Pigment Red 41 | 3H-Pyrazol-3-one,4,4'-[(3,3'-dimethoxy[1,1'-biphenyl]-4,4'-diyl)bis (azo)]bis[2,4-dihydro-5-methyl-2-phenyl- |
| C.I. Pigment Orange 34 | 3H-Pyrazol-3-one,4,4'-[(3,3'-dichloro[1,1'-biphenyl]-4,4'-diyl)bis (azo)]bis[2,4-dihydro-5-methyl-2-(4-methylphenyl)- |
| C.I. Pigment Blue 62 | 4,4'-Bis(diethylamino) benzophenone condensed with N-ethyl-1-naphthyl-amine in toluene with phosphorous oxychloride and converted to the copper ferrocyanide salt (PTMA salt in P.Blue 1) |
| C.I. Pigment Red 22 | 2-Naphthalenecarboxamide, 3-hydroxy-4-[(2-methyl-5-nitrophenyl)azo]-N-phenyl- |
| C.I. Pigment Red 170 | 2-Naphthalenecarboxamide, 4-[[(4-(aminocarbonyl) phenyl]azo]-N-(2-ethoxy-phenyl)-3-hydroxy- |
| C.I. Pigment Red 88 | Benzo[b]thiophen-3(2H)-one, 4,7-dichloro-2-(4,7-dichloro-3-oxobenzo[b]thien-2(3H)-ylidene)- |
| C.I. Pigment Yellow 151 | A diazotized aniline derivative coupled with an acetoacetyl derivative of 5-aminobenzimidazolone |
| C.I. Pigment Red 184 | A diazotized substituted aniline coupled with a |

-continued

| Generic Name | Pigments C.A. Index/Chemical Name |
|---|---|
| | derivative of 3-hydroxy-2-naphthanilide |
| C.I. Pigment Blue 1:2 | Ethanaminium, N-[4-[[4-(diethylamino)phenyl][4-(ethylamino)-1-1 naphthalenyl]methylene]-2,5-cyclohexadien-1-ylidene]-N-ethyl-, [orthosilicato(4-)] hexatriacontaoxo-dodecamolybdate(4)-(4:1) |
| C.I. Pigment Red 3 | 2-Naphthalenol, 1-[(4-methyl-2-nitrophenyl)azo]- |
| C.I. Pigment Blue 15:1 | Copper,[29H,32H-phthalocyaninato(2-)-$N^{29}$, $N^{30}$, $N^{31}$, $N^{32}$]-, (SP-4-1)- or Copper,[chloro-29H, 31H-phthalocyaninato (2-1)-$N^{29}$, $N^{30}$, $N^{31}$, $N^{32}$]- |
| C.I. Pigment Red 23 | 2-Naphthalenecarboxamide, 3-hydroxy-4-[(2-methoxy-5-nitrophenyl)azo]-N-(3-nitrophenyl)- |
| C.I. Pigment Red 112 | 2-Naphthalenecarboxamide, 3-hydroxy-N-(2-methylphenyl)-4-[(2,4,5-trichlorophenyl)azo]- |
| C.I. Pigment Yellow 126 | A tetrazotized derivative of 3,3-dichlorobenzidene coupled with a derivative of acetoacetanilide |
| C.I. Pigment Red 169 | 3-Ethylamino-p-cresol condensed with phthalic anhydride, esterified with ethanol and a mineral acid, and converted to the copper ferrocyanide complex (chloride salt is C.I. Basic Red 1, PTMA salt is P.Red 81:1). |
| C.I. Pigment Orange 13 | 3H-Pyrazol-3-one, 4,4'-[(3,3'-dichloro [1,1'-biphenyl]-4,4'-diyl)bis(azo)]bis[2,4-dihydro-5-methyl-2-phenyl- |
| C.I. Pigment Red 10 | 2-Naphthalenecarboxamide, 4-[(2,5-dichlorophenyl) azo]-3-hydroxy-N-(4-methylphenyl)- |
| C.I. Pigment Blue 1:X | Ethanaminium, N-[4-[[4-(diethylamino)phenyl][4-(ethylamino)-1-naphthalenyl]methylene]-2,5-cyclohexadien-1-ylidene]-N-ethyl-, molybdate-phosphate |
| C.I. Pigment Yellow 42 | Iron oxide ($Fe_2O_3$) hydrate |
| C.I. Pigment Red 101 | Iron oxide ($Fe_2O_3$) |
| C.I. Pigment Brown 6 | Iron oxide ($Fe_2O_3$), some FeO and $Fe_2O_3 \cdot H_2O$ |
| C.I. Pigment Brown 7 | Iron oxide ($Fe_2O_3$) plus varying amounts of clay |
| C.I. Pigment Brown 7:X | $Fe_2O_3 \cdot x\ MnO_2$ with varying amounts of clay |
| C.I. Pigment Black 11 | $FeO \cdot Fe_2O_3$ |
| C.I. Pigment Metal 1 | Aluminum |
| C.I. Pigment Metal 2 | Copper, zinc |

In accordance with the present invention, ink compositions prepared from the above polymer blends may be superior over prior aqueous ink compositions in one or more of such properties as pigment wetting, pigment stability, temperature stability (heat and freeze-thaw), nonsettling for extended periods of time, nonpolluting with respect to odor and volatile organics, nonflocculating, long "open" time in the press fountain, wide viscosity range inks, adhesion to a variety of substrates, hardness, gloss, drying rate on substrates, film-forming properties at low temperatures without organic co-solvents, resistance to grease, water and scuff, compatibility with other water-based inks, wet rub resistance, ink mileage characteristics (considerable water dilution allowable at the press), ink press stability in general, printability (clean, sharp transfer without "stringing or misting"), trapping, easy clean up, nonplugging of printing plates, flexibility, redispersibility or rewetting, crinkle resistance, solvent resistance, alkali, chemical and detergent resistance, blocking resistance, lightfastness, heat resistance, slip angle, coefficient of friction, toughness, substrate wetting, hold-out, opacity, dry-rate, and no offset on the printing press (coating e.g. on tension rollers).

The following examples are to illustrate the invention but should not be interpreted as a limitation thereon.

EXAMPLE 1

Polyester Preparation

A mixture of 79.5 g (0.41 mole) of dimethyl isophthalate, 26.6 g (0.09 mole) of dimethyl-5-sodiosulfoisophthalate, 54.1 g (0.51 mole) of diethylene glycol, 37.4 g (0.26 mole) of 1,4-cyclohexanedimethanol, 1.4 milliliter (mL) of a 1.0% (based on Ti) catalyst solution of titanium tetraisopropoxide, and 0.74 gram (g) (0.009 mole) of sodium acetate buffer is stirred and heated for two hours at 200°–220° C. The temperature is then raised to 275° C. and a vacuum of 0.3 millimeter (mm) is applied. Heating and stirring is continued for 1 hour under these conditions. After cooling, the polymer obtained has an inherent viscosity (I.V.) of 0.36 and is tough and rubbery. It is dissipatable in hot water to the extent of about 29 weight percent to give a clear, slightly viscous solution. The composition of the acid moieties of this polyester material is analyzed to be 82 mole % isophthalic acid residue and 18 mole % 5-sodiosulfoisophthalic acid residue, and of the glycol moieties is analyzed to be 54 mole % diethylene glycol and 46 mole % 1,4-cyclohexanedimethanol.

EXAMPLE 2

Polyester Dispersion Preparation

To 1,388.27 g of distilled water is added 660.0 g of polyester polymer, from Example 1 with stirring. The mixture is heated at 90° C. for two hours with stirring. The dispersion is cooled to 75° C. and 227.5 g of n-propyl alcohol is added dropwise with stirring. The dispersion is allowed to cool to 35° C. with stirring and 13.65 g of Tekamer 38 AD (biocide) is added with stirring. The clear polyester dispersion has the following composition.

| Component | Weight, % |
|---|---|
| Polyester Polymer (Example 1) | 28.91 |
| n-Propyl Alcohol | 10 |
| Tekamer 38AD | 0.6 |
| Water | 60.49 |

EXAMPLE 3

Preparation of Water-Based Overprint Varnish

The overprint varnishes (OPV) are made by slowly adding Joncryl 77 (see Table 1) to the polyester dispersion of Example 2 with stirring. The amounts of each component used and the resulting weight percent of Joncryl 77 polymer (% of total polymer solids) contained in the varnish is listed in Table 2. These varnishes are stirred for five minutes and then filtered through a cheese cloth.

TABLE 2

| | Composition of Overprint Varnish | |
|---|---|---|
| % Joncryl 77 Emulsion Used | % Polyester Dispersion Used | % Solid Joncryl 77 Per Total Polymer Solids |
| 0.00 | 100.0 | 0.00 |
| 3.08 | 96.92 | 5.00 |
| 6.29 | 93.71 | 10.00 |
| 9.63 | 90.37 | 15.00 |
| 13.12 | 86.88 | 20.00 |
| 16.76 | 83.24 | 25.00 |
| 20.57 | 79.43 | 30.00 |
| 24.55 | 75.45 | 35.00 |
| 28.71 | 71.29 | 40.00 |
| 33.78 | 66.22 | 45.78 |

EXAMPLE 4

Sample Preparation

The varnishes are applied on Aluminum Foil and Polypropylene with a Number 3 and 6 Meyer rod and with a Gravure and Flexo Handproofer. These samples are then allowed to dry for 24 hours at 70° F. (21.11° C.), 60% relative humidity or dried in the oven at 100° C. for 3 seconds.

EXAMPLE 5

Water Resistance Evaluation of Overprints

The overprints of Example 3 are applied to aluminum foil as described in Example 4. The water resistance of the samples are determined by the water spot test.
Water Spot Test—Distilled water drops were left on the film surface for 1, 5, and 20 minutes, then wiped off gently with a facial tissue. The integrity of the film is visually assessed.
The water spot test is rated as follows:
1. Poor: Total film removal
2. Fair: Partial film removal
3. Good: Dull or discolor film, but no removal
4. Excellent: The film is substantially unchanged The test results for the overprint varnishes of Table 2 are shown in Table 3. At least 30% Joncryl 77 (total polymer solids) is required to obtain excellent water resistance. The water resistance can also be determined by a water soak test.

TABLE 3

| | Effect of Joncryl 77 on Water Resistance of Overprint Varnish | | |
|---|---|---|---|
| Weight % J77D Emulsion Used | Weight % Polyester Dispersion Used | Weight % Solid J77 Polymer Per Total Polymer Solids | Water Res. Rating (Spot Test on Foil @ 20 Min.) |
| 0.00 | 100.00 | 0.00 | 1 |
| 3.08 | 96.92 | 5.00 | 1 |
| 6.29 | 93.71 | 10.00 | 1 |
| 9.63 | 90.37 | 15.00 | 1 |
| 13.12 | 86.88 | 20.00 | 1 |
| 16.76 | 83.24 | 25.00 | 1 |
| 20.57 | 79.43 | 30.00 | 4 |
| 24.55 | 75.45 | 35.00 | 4 |
| 28.71 | 71.29 | 40.00 | 4 |
| 33.78 | 66.22 | 45.78 | 4 |

EXAMPLE 6

Preparation of Printing Inks

An ink millbase was made by adding 100.0 g of blue pigment, PV Fast Blue B2G-A from Hoechst (Color Index Pigment Blue 15:3), 2.0 g of defoamer and 96.0 of water to 202.0 g of polyester dispersion (Example 2) or Joncryl 77 emulsion (Table 1). The mixture is then shaken with 400.0 g of glass beads for 4 hours on a paint shaker and is filtered through cheese cloth. To 50.0 g of the filterate is added with stirring 49.5 g of the polyester dispersion and/or the Joncryl 77 emulsion and 0.5 g of defoamer. Each ink contains 12.5% pigment, 0.75% defoamer, and varying percents of the polyester dispersion and Joncryl 77 emulsion as shown in Table 4, the percentages being by weight.

TABLE 4

| | Printing Ink Compositions | |
|---|---|---|
| % Polyester Dispersion | % Joncryl 77 Emulsion | % Solid Joncryl 77 Per Total Polymer Solids |
| 74.75 | 0.00 | 0.00 |
| 72.45 | 2.30 | 5.00 |
| 70.05 | 4.70 | 10.00 |
| 67.55 | 7.20 | 15.00 |
| 64.94 | 9.81 | 20.00 |
| 62.22 | 12.53 | 25.00 |
| 59.38 | 15.37 | 30.00 |
| 56.40 | 18.35 | 35.00 |
| 53.29 | 21.46 | 40.00 |
| 49.50 | 25.25 | 45.78 |

The samples and water resistance of these inks are prepared and determined by the same methods as used for the overprint varnishes. The results of the water resistance test are in Table 5.

TABLE 5

| Water Resistance of Polyester Inks | |
|---|---|
| Weight % Solid J77 Polymer Per Total Polymer Solids in Finished Ink | Water Res. Rating (Spot Test on Foil @ 20 Min.) |
| 0.00 | 1 |
| 5.00 | 1 |
| 10.00 | 1 |
| 15.00 | 1 |
| 20.00 | 1 |
| 25.00 | 3 |
| 30.00 | 4 |
| 35.00 | 4 |
| 40.00 | 4 |
| 45.78 | 4 |

EXAMPLE 7

Block Resistance of Water-Based Overprints and Inks with Joncryl 87 and Polyester Dispersion The preparation of the overprint varnish and ink is the same as in the above examples except Joncryl 87 (Table 1) is used instead of Joncryl 77. These overprint varnishes and inks have good water resistance at 30 weight percent or higher Joncryl 87 (weight percent of total polymer solids). The block resistance of these inks and overprints are determined as follows:

Sentinel Heat Sealer or Spring Load Tester are used to evaluate the block resistance of printed samples.

Sentinel Heat Sealer-Testing with the Sentinel Heat Sealer is done at 40 psi (275.79 kilopascal) and 5 seconds dwell-time. The ink films were tested face to face starting at 100° F. (37.78° C.), then raising the temperature in 5° F. (2.78° C.) increments to 200° F. (93.33° C.).

Spring Load Tester-Testing was done at 40 psi (275.79 kilopascal). The ink films were tested face to face and were placed in the oven at 120° F. (48.89° C.) for 24 hours.

The inks and overprint varnishes are applied to 60-pound (27.22 kilogram (kg)) paper label stock as described in Example 4. The printed samples were permitted to dry or age at 70° F. (21.11° C.) and 60% relative humidity for 24 hours. The samples containing 30% or higher Joncryl 87 (percent total polymer solids) did not block (face to face) at 140° to 180° F. (60° to 82.2° C.) for 5 seconds on Sentinel Heat Sealer at 40 psi (275.79 kilopascal), and had excellent water resistance. The samples printed with inks or overprint varnishes containing 0% to 30% by weight Joncryl 87 and 100% to 70% by weight polyester polyester polymer blocked at 100° to 120° F. (37.78° to 48.89° C.) under the same conditions.

EXAMPLE 8

Compatibility Test

The compatibility test of the polymer blends in the ink composition is monitored by pH readings, viscosity change and observed gelling after aging the sample for 2 weeks in the oven at 120° F. (48.89° C.) and 4 weeks at room temperature, 70° F. (21.11° C.), and also after putting them in the freezer at −25° F. (−31.67° C.) for 24 hours (3 cycles). The results of one sample are in Table 6.

TABLE 6

Stability of Printing Ink (With 45.78% Joncryl 77 Per Total Polymer Solids) (See Table 4)

| | pH | Viscosity (#2 Zahn Cup) [Second] |
|---|---|---|
| *Initial | 8.03 | 20 |
| *At Room Temperature 70° F. (21.11° C.) | | |
| After 1 week | 8.03 | 20 |
| After 2 weeks | 7.97 | 20 |
| After 4 weeks | 7.80 | 20 |
| After 6 weeks | 7.76 | 20 |
| After 8 weeks | 7.79 | 21 |
| *In the Oven 120° F. (48.89° C.), 2 Weeks | | |
| | 7.74 | 22 |
| *In the Freezer −25° F. (−31.67° C.), 17 Hours, 3 Cycles | | |
| | 7.77 | 20 |

EXAMPLE 9

Preparation of Ink from Joncryl 74

To 103.4 g of the polyester dispersion from Example 2 is added 100.0 g of water, 4.7 g of n-propyl alcohol, 61.9 g of Joncryl 74 (see Table 1), acrylic polymer emulsion, and 30.0 g of PV Fast Blue B2G-A from Hoechst (C.I. Pigment Blue 15:3) with stirring. To this mixture is added 4.2 g of Acrysol RM-825 (from Rohm and Haas). This mixture is circulated through an Eiger Mini Motor Mill (grinding media-ceramic beads) at 5,000 rpm for 5 minutes. The resulting had a viscosity of 17 seconds on a No. 2 Zahn cup. The composition of this ink is as follows.

| Component | Weight, % |
|---|---|
| C.I. 15:3 Pigment | 10 |
| Polyester Polymer | 10 |
| Joncryl 74 Polymer | 10 |
| n-propylalcohol | 5 |
| Acrysol RM-825 | 0.14 |
| Water | 64.86 |

This 50/50 acrylic/polyester (% of total polymer solids) ink is applied on aluminum foil and a coated paper stock as described in Example 4. The water resistance of the room temperature dried samples is determined as described in Example 5. Excellent water resistance is obtained with this 50% solid Joncryl 74 (per total polymer solids) ink. The viscosity of this ink after one week at 120° F. (48.89° C.) is constant (17 seconds) on a No. 2 Zahn cup.

The block reistance of this ink on paper and aluminum foil is determined as described in Example 7. The paper sample did not block at 140° F. (60° C.) and the aluminum foil sample did not block at 190° F. (87.78° C.). The corresponding 100% polyester solids ink blocked at 120° to 130° F. (48.89° C. to 54.44° C.) on the same substrates.

EXAMPLE 10

Preparation of Joncryl 67 Acrylic Solution

With stirring 25.0 g of Joncryl 67 (see Table 1) is added to 69.1 g of water containing 5.9 g of ammonia hydroxide solution (28% ammonia). The mixture is stirred at 50° to 60° C. for one hour until a clear solution is obtained. The pH of this solution is 8.6 and the weight percent of Joncryl 67 is about 25%.

EXAMPLE 11

Preparation of Ink from Joncryl 67 Acrylic Solution

To 8.28 g of polyester dispersion of Example 2 is added 3.0 g of Joncryl 67 solution of Example 9, 0.75 g of Flexiverse Yellow YFD5100 (commercial pigment dispersion from Sun Chemical), 1.2 g of Flexiverse Red RFD4257, and 1.77 g of water with stirring.

The Flexiverse dispersions are assumed to contain 8.75 weight percent of Joncryl 67 acrylic polymer. The resulting ink contains about 26% Joncryl 67 and 74% polyester (weight percent of total polymer) polymers.

The ink is applied on aluminum foil as in Example 4 and allowed to dry overnight at room temperature. The water resistance of this ink is determined as described in Example 5. This ink has excellent water resistance. Excellent water resistance is obtained with inks containing at least 25% Joncryl 67 and 75% polyester polymer (weight percent of total polymer solids).

The invention has been described in detail with particular reference to preferred embodiments thereof, but it will be understood that variations and modifications can be effected within the spirit and scope of the invention.

We claim:

1. A printed substrate comprising an ink composition printed onto a substrate selected from metal foil, newsprint, bleached and unbleached kraft paper, clay coated paper, glass, calendered paper, stainless paper, paper board, and films or other substrates of polyester, polycarbonate, cellulose ester, regenerated cellulose, poly(vinylidene chloride), polyamide, polypropylene, polyethylene or polystyrene, wherein said ink composition comprises:

(I) about 5 to 40 weight percent of a polymer blend, comprising (A) a linear water-dissipatable polymer having carbonyloxy linking groups in the linear molecular structure wherein up to 80% of the linking groups are carbonylamido linking groups, the polymer having an inherent viscosity of from about 0.1 to about 1.0 measured in a 60/40 parts by weight solution of phenol/tetrachloroethane at 25° C. and at a concentration of 0.25 gram of polymer in 100 mL of the solvent, the polymer containing substantially equimolar proportions of acid equivalents (100 mole %) to hydroxy and amino equivalents (100 mole %), the polymer comprising the reaction products of reactants selected from (1), (2), (3), and (4), or the ester forming or esteramide forming derivatives thereof, as follows, wherein all stated mole percentages are based on the total of all acid, hydroxyl and amino equivalents being equal to 200 mole %:

(1) at least one difunctional dicarboxylic acid;

(2) from about 4 to about 25 mole % of at least one difunctional sulfomonomer containing at least one metallic sulfonate group or nitrogen-containing non-metallic sulfonate group attached to an aromatic or cycloaliphatic nucleus wherein the functional groups are hydroxy, carboxyl or amino;

(3) at least one difunctional reactant selected from a glycol or a mixture of a glycol and diamine having two —NRH groups, the glycol containing two —CH$_2$—OH groups of which (a) at least 15 mole % is a poly(ethylene glycol) having the structural formula

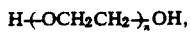

n being an integer of from 2 to about 20, or (b) of which from about 0.1 to less than about 15 mole % is a poly(ethylene glycol) having the structural formula

n being an integer of between 2 and about 500, and with the proviso that the mole % of said poly(ethylene glycol) within said range is inversely proportional to the quantity of n within said range;

(4) from none to about 40 mole % of difunctional reactant selected from hydroxycarboxylic acids having one —C(R)$_2$—OH group, aminocarboxylic acids having one —NRH group, and amino-alcohols having one —C(R)$_2$—OH group and one —NRH group, or mixtures of said difunctional reactants; and wherein each R in the (3) and (4) reactants is a hydrogen atom or an alkyl group of 1 to 4 carbons; and (B) an acrylic polymer in an amount effective to increase the block resistance or water resistance properties of Component (A), when formulated into an ink composition, said acrylic polymer being compatible with the water-dissipatable polyester at an acrylic polymer concentration of 30 weight percent of the total acrylic/polyester polymer solids, which will not gel or have a significant increase in viscosity after being held at 120° F. for 24 hours or at room temperature for 14 days, (II) about 0 to 45 weight percent of at least one colorant, and (III) about 35 to 95 weight percent of water.

2. The printed substrate of claim 1 wherein said acrylic polymer is compatible with the water-dissipatable polyester at an acrylic concentration of 40 percent based on the weight of the blend of acrylic polymer/water-dissipatable polyester.

3. The printed substrate of claim 1 wherein said acrylic polymer is compatible with the water-dissipatable polyester at an acrylic concentration of 50 percent based on the weight of the blend of acrylic polymer/water-dissipatable polyester.

4. The printed substrate of claim 1 wherein said water-dissipatable polymer of Component (I) (A) comprises one or more polyesters having an inherent viscosity of from about 0.28 to about 0.35, an acid moiety of from about 75 to about 84 mole % isophthalic acid and conversely from about 25 to about 16 mole % 5-sodiosulfoisophthalic acid, and a glycol moiety of from about 45 to about 60 mole % diethylene glycol and conversely from about 55 to about 40 mole % 1,4-cyclohexanedimethanol or ethylene glycol or mixtures thereof.

5. The printed substrate of claim 4 wherein said acid moiety comprises from about 80 to about 83 mole % isophthalic acid and conversely from about 20 to about 17 mole % 5-sodiosulfoisophthalic acid, and said glycol moiety comprises from about 52 to about 56 mole % diethylene glycol and conversely from about 48 to about 44 mole % 1,4-cyclohexanedimethanol.

6. The printed substrate of claim 1 wherein said acrylic polymer of Component (I) (B) comprises at least one acrylic polymer having a molecular weight of at least about 200,000, an acid number of less than about 55, and a Tg of greater than 0.

7. The printed substrate of claim 1 wherein said acrylic polymer of Component (I) (B) comprises repeating units of the formula:

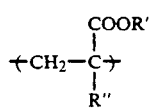

wherein R' is H or is a straight, branched, or cyclic alkyl group of 1 to 20 carbon atoms, substituted with 0 to 2 substituents selected from the group consisting of $C_1-C_6$ alkoxy and halogen; and R" is H or methyl.

8. The printed substrate of claim 7 wherein R' is H, methyl, ethyl, propyl, isopropyl, n-butyl, sec-butyl, isobutyl, tert-butyl, hexyl, heptyl, 2-ethylhexyl, 2-ethylbutyl, dodecyl, hexadecyl, 2-ethoxyethyl, or cyclohexyl.

9. The printed substrate of claim 7 wherein said acrylic polymer further comprises repeating units of the formula:

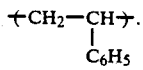

10. The printed substrate of claim 1 wherein, for said ink composition, Component (I) is present in an amount of about 5 to 40 weight percent, Component (II) is present in an amount of about 0 to 35 weight percent, and Component (III) is present in an amount of about 35 to 95 weight percent.

11. The printed substrate of claim 1 wherein said ink composition additionally comprises up to about 10 weight percent of one or more additives.

12. The printed substrate of claim 1 wherein said ink composition additionally contains up to about 3 weight percent of one or more additives selected from the group consisting of a wax, a surfactant, a defoamer, an organic solvent, a biocide, a dispersant, and a thickener.

13. The printed substrate of claim 1 wherein said ink composition has good water resistance and has the property of not blocking above about 100° F. for 5 seconds on a Sentinel Heat Sealer at 40 psi.

14. The printed substrate of claim 1 wherein said ink composition has excellent water resistance and has the property of not blocking above about 120° to 220° F. for 5 seconds on a Sentinel Heat Sealer at 40 psi.

15. The printed substrate of claim 1 wherein said ink composition has a pH of about 7 to 8.

16. The printed substrate of claim 1 wherein the colorant is one or a mixture of the following color index materials: C.I. Pigment Yellow 17, C.I. Pigment Blue 27, C.I. Pigment Red 49:2, C.I. Pigment Red 81:1, C.I. Pigment Red 81:3, C.I. Pigment Red 81:x, C.I. Pigment Yellow 83, C.I. Pigment Red 57:1, C.I. Pigment Red 49:1, C.I. Pigment Violet 23, C.I. Pigment Green 7, C.I. Pigment Blue 61, C.I. Pigment Red 48:1, C.I. Pigment Red 52:1, C.I. Pigment Violet 1, C.I. Pigment White 6, C.I. Pigment Blue 15, C.I. Pigment Yellow 12, C.I. Pigment Blue 56, C.I. Pigment Orange 5, C.I. Pigment Black 7, C.I. Pigment Yellow 14, C.I. Pigment Red 48:2, C.I. Pigment Blue 15:3, C.I. Pigment Yellow 1, C.I. Pigment Yellow 3, C.I. Pigment Yellow 13, C.I. Pigment Orange 16, C.I. Pigment Yellow 55, C.I. Pigment Red 41, C.I. Pigment Orange 34, C.I. Pigment Blue 62, C.I. Pigment Red 22, C.I. Pigment Red 170, C.I. Pigment Red 88, C.I. Pigment Yellow 151, C.I. Pigment Red 184, C.I. Pigment Blue 1:2, C.I. Pigment Red 3, C.I. Pigment Blue 15:1, C.I. Pigment Red 23, C.I. Pigment Red 112, C.I. Pigment Yellow 126, C.I. Pigment Red 169, C.I. Pigment Orange 13, C.I. Pigment Red 1-10, 12, C.I. Pigment Blue 1:X, C.I. Pigment Yellow 42, C.I. Pigment Red 101, C.I. Pigment Brown 6, C.I. Pigment Brown 7, C.I. Pigment Brown 7:X, C.I. Pigment Black 11, C.I. Pigment Metal 1, or C.I. Pigment Metal 2.

17. The printed substrate of claim 1 wherein the polyester contains one or more water solubilizing metallic sulfonate groups and a substantial portion of the metal of said water solubilizing metallic sulfonate groups has been replaced with an insolubilizing polyvalent metal cation.

* * * * *